June 30, 1931.  F. O. BLACK  1,812,580
VEHICLE AND TAILBOARD CONSTRUCTION
Filed March 5, 1929
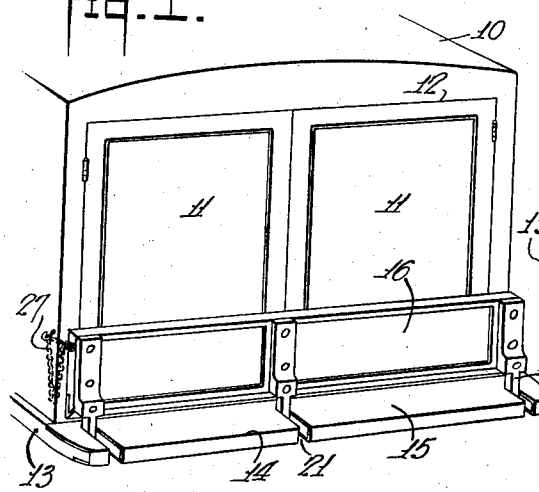
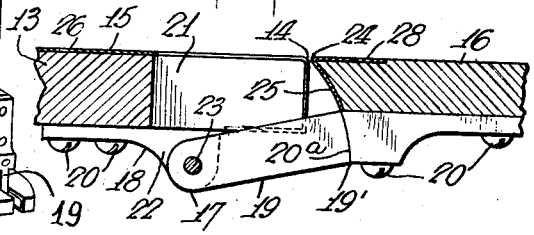
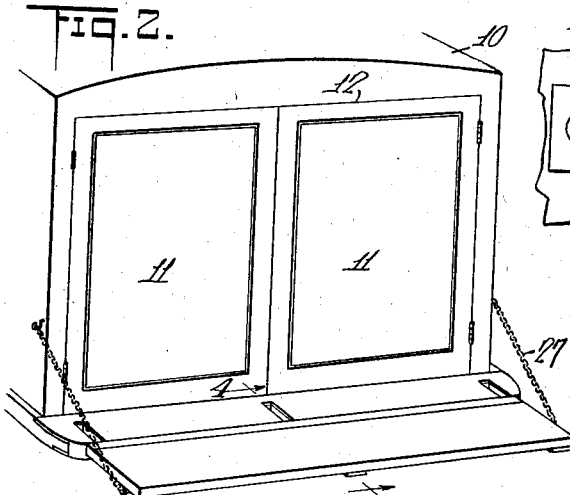
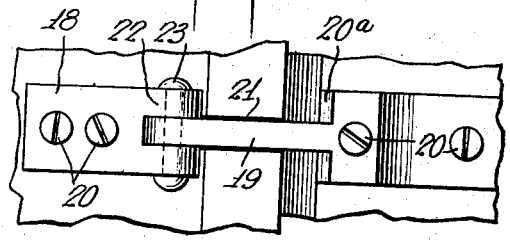
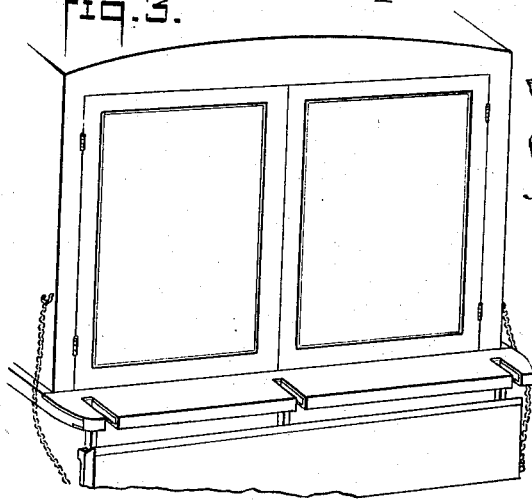
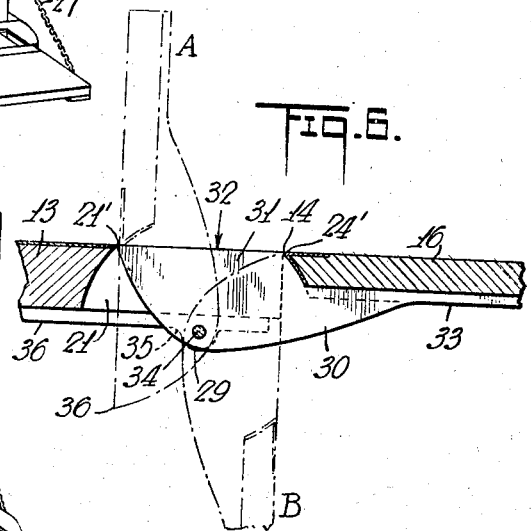
INVENTOR
Frederick O. Black
BY
his ATTORNEY Patented June 30, 1931

1,812,580

UNITED STATES PATENT OFFICE

FREDERICK O. BLACK, OF JERSEY CITY, NEW JERSEY

VEHICLE AND TAILBOARD CONSTRUCTION

Application filed March 5, 1929. Serial No. 344,242.

This invention relates to a vehicle body construction; more particularly, to a tailboard construction for moving vans.

It is an object of my invention to associate a tailboard in its combination with a wagon in such a manner as not only to be hingedly positioned, serving as a closure for the rear end of the wagon, but to provide a continuous unloading platform for the tail end of the wagon floor. It is contemplated by my invention to so associate a tailgate with the wagon floor that it may be used as a continuous and smooth platform extension with the floor of the wagon when in the open position, and which may in the closed position provide a protective end in the nature of a bumper for the tailgate, particularly the supporting means for the tailgate, such as the hinges thereof.

It is a still further object of my invention to provide a tailboard for a wagon which may be quickly and readily moved hingedly, forming a smooth and continuous platform with the floorboard whereby the articles may be loaded or unloaded along the length of the floor and across the contacting joint of the tailboard and wagon floor without necessitating the use of filler blocks between these two members so that articles of furniture may be rolled over the floorboard and the platform formed by the tailboard without danger of obstructing the free sliding movement of these articles or catching or breaking castors, upon which articles of furniture are generally mounted.

Still further objects of my invention reside in providing reinforcing means for the rear end of the floorboard of a wagon and mounting a tailboard thereupon, the reinforcement for the floorboard serving in the nature of a bumper or guard for the mounting means, such as hinge members of a tailboard, and at the same time providing an exposed sill whereby large objects may be supported upon the exterior of the van, thereby augmenting the capacity of the vehicle for transporting articles without requiring any unusual care in fastening the same to the vehicle, as the ledge or sill formed serves as an efficient supporting means, requiring merely strapping of the articles to the exterior of the van to adequately support articles of furniture, such as bed springs or bed steads to the outside of the van. Still further objects of my invention reside in the provision of a wagon construction including a tailboard associated therewith which will not leave the mounting means for the tailboard exposed to blows, as when a moving van is backed into position for loading or unloading. It is contemplated by my invention to provide a tailboard construction and mounting means therefor in the nature of hinges, the hinge members being unexposed to the extreme edge of the wagon, the latter forming a bumper or guard for the hinge members and the tailboard being movable in all positions in performing its intended function, such as a closure, a loading platform and in its position as a loading platform, the tailboard forms a substantial platform continuous with the floor board whereby rollable or slidable objects, particularly those including castors, may be moved across from the floor to the platform, or vice versa, without danger of obstruction or damaging of the legs or castors supporting them.

Still further objects of my invention reside in the provision of means for hinging the tailboard in position from points adjacent the end of a floorboard of a wagon to provide no exposed hinged parts to the end of the wagon, which may be damaged in the ordinary use of the wagon in backing to or up against a loading platform or the like, the hinge members being positioned to dispose the tailboard for forming a substantially smooth, continuous surface with the floorboard of the wagon, the hinge members being so formed to expose a bumper and loading sill in the closed position and fill the clearance spaces necessary for mounting the hinged members when the tailboard is used as a loading platform, to thereby further ensure a smooth and continuous surface between the floorboard and the tailboard.

A still further object of my invention resides in the provision of a tailboard construction including strong, efficient and simple construction of parts, involving low cost of production and simplicity of installation.

To attain these objects and such further objects as may appear herein or be hereinafter pointed out, I make reference to the accompanying drawings forming part hereof, in which—

Figure 1 is a perspective view of the rear end of a van, disclosing my invention;

Figure 2 is a perspective view, similar to Figure 1, showing the tailboard in a position aligned with the wagon floor;

Figure 3 is a perspective view, similar to Figures 1 and 2, with the tailboard in the hanging position;

Figure 4 is an enlarged detail taken on the line 4—4 of Figure 2;

Figure 5 is a bottom view of the detail shown in Figure 4;

Figure 6 is an enlarged detail of another embodiment of my invention.

Making reference to the drawings, it will be observed that my device is preferably associated with a vehicle, such as a moving van 10, having rear doors 11, preferably hinged thereto and occupying substantially the entire opening 12. These may hinge outwardly beyond the end of the body, as will be readily understood. The van floor 13 is preferably formed to extend the end 14 thereof beyond the doors 11, thereby providing a sill 15. To this extension I attach my tailboard 16 by the hinge 17, comprising the hinge members 18 and 19, respectively, which are affixed to the floor and tailboard 13 and 16, respectively, at the bottom side, by screw bolts 20 or the like, fastening elements. The hinge member 18 is disposed to the bottom side of the floorboard, immediately beneath a slot 21, to present the spaced pivotal bosses 22 to either side of the walls of the slot 21. Through these bosses I affix the hinge section 19 by passing the pintle bolt 23 through the end of the member 19, and the pivotal bosses 22. The section 19 is of a thickness to move snugly within the slot 21, and to the section 19 I attach the tailboard 16, with its end 24 of a length from the pintle bolts 23 to just contact with the edge 14 of the floor board 15. Thus, in its pivotal movement with the section 19 as a radius, the edge 24 of the tailboard will, in the vertical position as shown in Figure 1, be brought past the edge 14, carrying the tailboard for a substantial distance from the edge and providing a sill 15 beyond its vertical position. It is preferred to make the tailboard material of lighter weight than the material which forms the floorboard of the van and for this purpose the section of the hinge member 19 is angularly offset at 19′, beyond the flanges 20a. This also forms the clearance portion of the arm 19 in its pivotal movement to the vertical position and is substantially in line with the clearance edge 25, formed on the tailboard 16. It will be observed that with the hinged mounting for the tailboard as described, in addition to obtaining an extended sill 15, beyond the tailboard, valuable for purposes of loading articles with the doors 11 in the closed position, for purposes of transporting large articles which do not conveniently fit within the van I also provide a protective guard or bumper for the extreme end of the vehicle, particularly for the hinge section serving to support the tailboard. Thus, the wagon may be backed into loading and unloading position without fear of damaging the tailboard or the tailboard hinges mounting the same. I may for this purpose, also, additionally protect the floorboard material with metal sheeting 26, which I extend beyond the edge 14 and downwardly on its under surface. This may be steel or other similar material, serving to protect the floor bottom material which is usually made of wood.

In addition, the tailboard may be pivoted to substantially the horizontal position as shown in Figures 2 and 4 and held in this position by the usual chains 27 from the hook and shackle attached to the edge of the wagon body and tailboard, respectively, or I may release the chain so that the tailboard swings downwardly beneath the floor board of the wagon, as shown in Figure 3. In this position, the edge 14 functions very efficiently as a bumper or guard for the van when this is backed into position for loading or unloading. In a manner similar to that previously described, the edge 14 extends beyond the support for the tailboard 16, protecting the hinges and tailboard in the extreme open position, from damage.

With the tailboard as used in the horizontal position, shown in Figures 2 and 4, the floorboard 13 and the upper edge of the tailboard 16 will form a substantially continuous surface as the edges of each are in contact with each other, thus eliminating the necessity of using any filler boards between these two edges. When so positioned, articles may be loaded or unloaded into and from the van without fear of catching such articles as the castors or legs of furniture between the spaced portions of the tailboard and the floorboard. In order to obtain more intimate contact between the edge 14 of the floorboard and the edge 24 of the tailboard, I may encase the edge of the latter with metallic sheeting material 28. Thus, the articles of furniture or the like which are slid across the contacting edges will not mar or splinter the wood of the edges 14 or 24, in addition to assuring minimum friction over this point and a close and tight fit.

In Figure 6 I have shown another embodiment of my invention, particularly as to the hinged connection of the tailboard. In this embodiment, the floorboard 13 is provided with a slotted portion 21, as in the previous embodiment. The tailboard 16 is hinged to the floorboard by a hinge 29 and this comprises the tailboard section 30, having a leaf 31 which fills substantially the entire slot 21. It is preferably provided with a straight edge 32 so that with the tailboard 16 horizontally disposed, as shown in Figure 6, the leaf 31 will fill completely the slot 21, with the straight edge 32 in line with the upper surface of the floorboard. The section 30, at its rearward portion, is provided with a transversely formed flange 33, to which the tailboard 16 is attached by fastening elements, such as screw bolts or the like. At the extreme curved portion of the section 30 there is provided a pivot point 34, which aligns with complemental orifices in the bosses 35 of the spaced rear sections of the hinge 36. These members are disposed to either side of the slot 21, at the lower surface of the tailboard. It will be observed that in pivoting the tailboard in this embodiment about the pivot point 34, the extreme point 21' of the section 30 will clear past the rear wall of the slot 21 arcuately formed. By continued movement to the vertical position, as shown at A, the edge 24' of the tailboard will serve as a stop, preventing any further inward tilting movement. The tailboard may also be pivoted to the position shown in dotted lines at B, if it is not desired to use the tailboard 16 as a platform. As in the previous embodiment the edge 14 of the floorboard serves as a guard or bumper for the hinge members, protecting the same when the van is backed into a loading platform. Additionally, this extension beyond the tailboard serves as a sill upon which articles may be mounted outside of the van. It will be observed, particularly by the embodiment illustrated in Figure 6 and with the tailboard disposed in the horizontal position, that I provide a simple and continuous surface between the floorboard of the wagon and the tailboard, with the edges 14 and 24' in intimate contact, avoiding any slots or spaced portions which may catch articles which are slid across the edges of the floorboard and tailboard, to and from the interior of the van, thus requiring no filler boards between the floorboard and tailboard.

Additionally, also, I avoid any open spaces at the slot 21, as the upper edge of the leaf 31 completely fills this portion when the floorboard is in the horizontal position. Thus, I may attach a floorboard 16 by as many hinges as desired, to the portion adjacent the edge of the floorboard, without fear of destroying the smoothness of the surface between the edge of the floorboard and the edge of the tailboard. It will also be observed that though I have illustrated the tailboard as preferably attached to the floorboard of the van by three spaced hinges, these may be increased in number to obtain the desired strength or the middle hinge may be omitted in the embodiments illustrated in Figures 1, 2 and 3, to avoid forming any depression or slotted sections necessary in assembling the hinge to the floorboard.

As indicated above, the tailboard 16 is preferably made of material thinner than that of the floorboard 13 not only to lighten the weight of this member but by this construction I may shorten the length of the hinge sections 19 and 30 in the embodiments illustrated in Figures 4 and 6, respectively, and still, by the clearance provided by the difference in thickness between the tailboard and the floorboard, get adequate clearance over the edge 14 and the extension of this edge 14 beyond the position assumed by the tailboard in its vertical position to augment the length of the bumper surface, at the same time strengthening the hinge mounting of the tailboard.

In general, it will be observed that I have provided a new and novel body and tailboard construction which has the desirable features of bringing the edge of the tailboard in close and intimate contact with the edge of the floorboard, providing a protective guard or bumper for the wagon or van, in addition to the hinged parts which serve as a means of supporting the tailboard, further augmenting the supporting area outside the van in the nature of a sill, upon which articles may be conveniently and easily supported.

Having thus described my invention and illustrated its use, what I claim as new and desire to secure by Letters Patent, is—

1. In a vehicle body construction, the combination with the floorboard, of a tailboard hingedly mounted thereto, hinge sections for said tailboard connected to said tailboard and floorboard, respectively, said sections including a common pivot inwardly of the rear end of the floorboard, guiding the inner edge of the tailboard in substantially close contact with the end of the floorboard in the horizontal position of the tailboard to form a smooth and continuous surface and locating the tailboard inwardly of the floorboard rear end in the vertical position of the tailboard whereby the floorboard end forms a bumper or guard for the tailboard.

2. In a vehicle body construction, the combination with a floorboard and the unloading end thereof, of a tailboard hingedly mounted to the floorboard, hinge sections formed as part of said tailboard and floorboard respectively, said sections including a common pivot point inwardly of the end of the floorboard, guiding the inner edge of the tailboard in substantially close contact with the end of the floorboard in the horizontal position of the tailboard to form a smooth and continuous surface for unloading and positioning the tailboard inwardly of the floorboard end in vertical position of the tailboard whereby the floorboard end forms a sill and a bumper or guard for the tailboard and hinge sections.

3. In a vehicle body construction, the combination with the floorboard of a tailboard hingedly mounted thereto, hinge sections connected to said tailboard and floorboard respectively, one of said sections guiding the inner edge of the tailboard in close contact with the end of the floorboard, guiding slots formed in said floorboard for said hinge sections to which said tailboard is connected, said hinge sections including a filler portion to fill said slots when said tailboard is disposed in the horizontal position, whereby a smooth and continuous surface is provided between the floorboard and the tailboard.

4. In a vehicle body construction, the combination with a floorboard, of a tailboard hingedly mounted to the floorboard, hinge sections connected to said floorboard and tailboard respectively, including a common pivot adjacent the end of the floorboard, the hinge section connected to the tailboard being extended beyond the end of the tailboard for guiding the inner edge of the tailboard in close contact with the end of the floorboard when the tailboard is in the horizontal position, said tailboard being formed of a thinner section than the floorboard to thereby dispose the tailboard inwardly of the floorboard end when the tailboard is in a vertical position, and to thereby have the edge of the floorboard form a bumper or guard for the tailboard.

In witness whereof I have hereunto signed my name this 25th day of February, 1929.

FREDERICK O. BLACK.